United States Patent [19]

Wada

[11] 3,767,986

[45] Oct. 23, 1973

[54] DRIVE CIRCUIT FOR BRUSHLESS MOTOR

[75] Inventor: Kinzo Wada, Kanagawa-ku, Yokohama City, Japan

[73] Assignee: Victor Company of Japan, Tokyo, Japan

[22] Filed: Nov. 30, 1972

[21] Appl. No.: 310,785

[30] Foreign Application Priority Data

Nov. 30, 1971 Japan.............................. 46/96493

[52] U.S. Cl.................. 318/138, 318/254, 318/434
[51] Int. Cl. ............................................ H02k 29/00
[58] Field of Search.................... 318/138, 254, 430, 318/432, 434

[56] References Cited
UNITED STATES PATENTS

| | | | |
|---|---|---|---|
| 3,440,506 | 4/1969 | Krestel et al........................ | 318/138 |
| 3,518,517 | 6/1970 | Rainer ............................... | 318/138 X |
| 3,562,909 | 3/1972 | Rainer et al. .................... | 318/138 X |
| 3,716,769 | 3/1973 | Brunner............................. | 318/254 |

Primary Examiner—Gene Z. Rubinson
Attorney—Robert Osann et al.

[57] ABSTRACT

A drive circuit arrangement for driving a two or four-phase brushless motor which generally comprises a pair of Hall generators mounted on the stator of the motor in such a manner as to be spaced from each other through a rectangular electric angle, at least two drivers for energizing the field coils of the motor in dependence on the output voltages of the Hall generators, and a pair of biasing circuits one of which biases one of the Hall generators in accordance with the intensity of the field current flowing through a field coil associated with the other Hall generator, thereby to maintain uniform the field currents flowing through the respective phase field coils.

4 Claims, 14 Drawing Figures

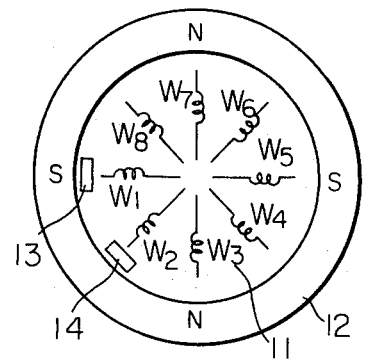
Fig. 1
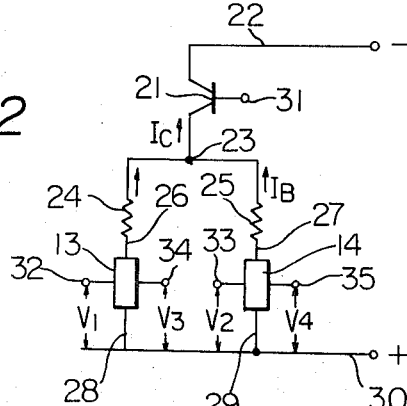
Fig. 2
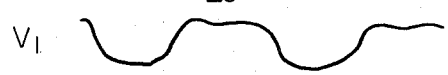
Fig. 3A  $V_1$
Fig. 3B  $V_2$
Fig. 3C  $V_3$
Fig. 3D  $V_4$

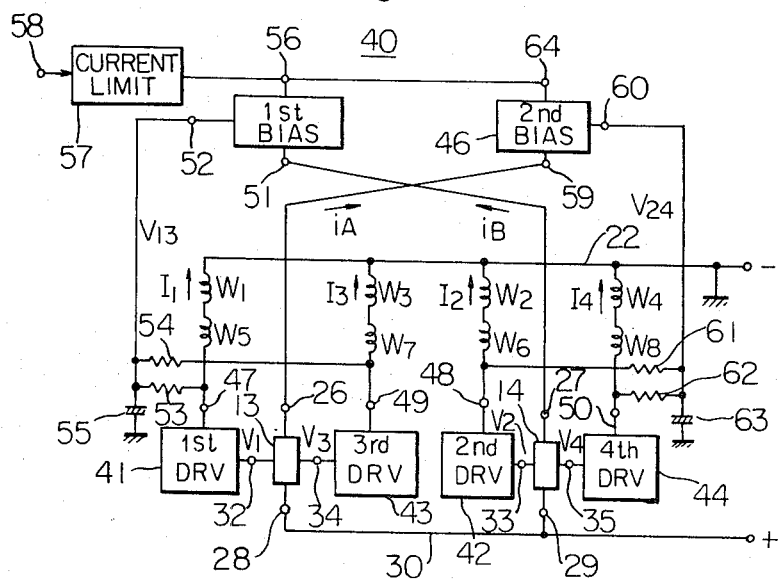
Fig. 4
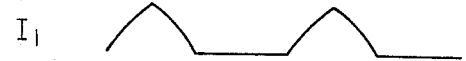
Fig. 5A   $I_1$
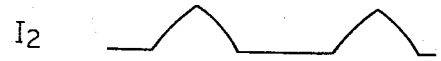
Fig. 5B   $I_2$
Fig. 5C   $I_3$
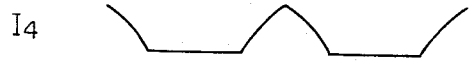
Fig. 5D   $I_4$

DRIVE CIRCUIT FOR BRUSHLESS MOTOR

This invention relates to d-c brushless motors and more particularly to an improved drive circuit arrangement for driving a d-c brushless motor.

It is a principal object of the present invention to provide an improved circuit arrangement for driving a d-c brushless motor, which uniformly energize the field coils so as to make the motor to smoothly rotate.

It is another object of the present invention to provide an improved circuit arrangement for driving a d-c brushless motor, which can drive a brushless motor without unwanted overcurrent through one or more field coils of the motor.

Other and many of the attendant advantages of the present invention will become readily apparent to those skilled in the art as an understanding thereof is obtained by reference to the following description when considered in connection with the accompanying drawings, wherein:

FIG. 1 is a simplified diagram of a 4-phase brushless motor;

FIG. 2 is a conventional drive circuit arrangement for driving a 4-phase brushless motor;

FIGS. 3A, 3B, 3C and 3D are diagrams showing waveforms of output voltages of the Hall generators in the circuit arrangement of FIG. 2;

FIG. 4 is a drive circuit arrangement according to the present invention;

FIGS. 5A, 5B, 5C and 5D are diagrams showing waveforms of field currents flowing through the field coils of the motor of FIG. 1.

Figure 6:
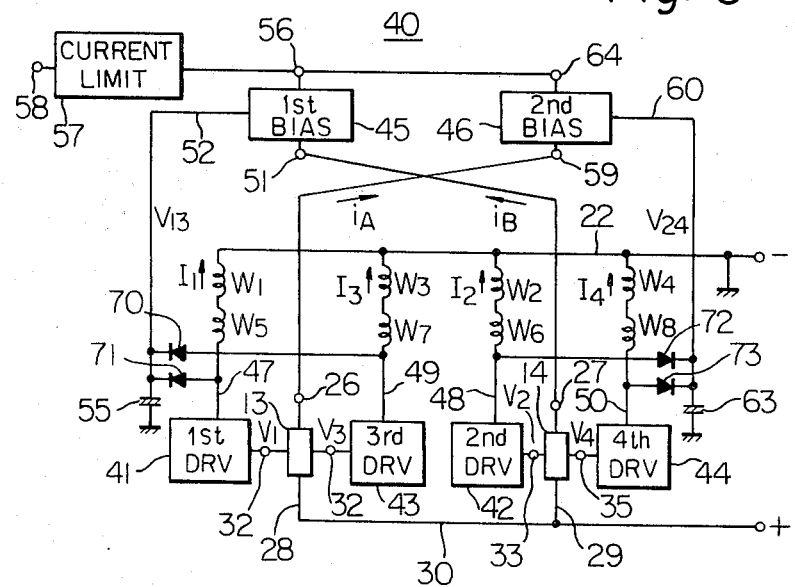
FIG. 6 is a diagram showing another drive circuit arrangement according to the invention.

In FIG. 1, there is diagrammatically shown a typcial four-phase brushless motor 10 of outer rotor type, which includes an inner stator 11 having eight slots (not shown) on the peripheral wall thereof, and an outer rotor 12 surrounding the stator 11 and having two pairs of magnetic poles. In the slots of the stator 11 are respectively accommodated eight field coils W1, W2, W3, W4, W5, W6, W7 and W8. The field coild W1 and W5, W2 and W6, W3 and W7, and W4 and W8 correspond to the four phases of the motor, respectively. A pair of Hall generators 13 and 14 are mounted on the peripheral wall of the stator 11 in such a manner as to be spaced from each other through an electric angle of 90°.

In FIG. 2, there is shown a conventional circuit arrangement 20 for driving a four-phase brushless motor as exemplified in FIG. 1, which comprises a transistor 21 having an emitter connected to a negative bus line 22 on which a negative voltage is impressed. A collector of the transistor 21 is connected through a joint 23 to terminals of a pair of resistors 24 and 25. The other terminals of the resistors 24 and 25 are respectively connected to negative bias terminals 26 and 27 of the Hall generators 13 and 14. The positive bias terminals 28 and 29 of the Hall generators 13 and 14 are connected to a positive bus line 30 to which a positive voltage is impressed. A current regulator (not shown) is connected to a control terminal 31 to which a base of the transistor 21 connected. The Hall generators 13 and 14 respectively have output terminals 32 and 34, and 33 and 35 on which output voltages $V_1$ and $V_3$, and $V_2$ and $V_4$ appear. The output voltages of each Hall generator are inverse to each other, namely, shifted in phase from each other through 180° and have intensities in dependence on the intensity of a bias current flowing through the Hall generator and the magnitude of a magnetic field applied to the generators. Since the Hall generators 13 and 14 are spaced in phase from each other through a rectangular electric angle as mentioned above, the output voltage $V_1$ is delayed in phase from the voltage $V_2$ by 90°, and accordingly the voltages $V_1$, $V_2$, $V_3$ and $V_4$ are different in phase from one another by 90° as shown in FIGS. 4A, 4B, 4C and 4D. A driver unit is (not shown) is provided which energizes the field coils $W_1$ and $W_5$, $W_3$ and $W_7$, $W_2$ and $W_6$, and $W_4$ and $W_8$ in dependence on the intensities $V_1$, $V_2$, $V_3$ and $V_4$.

When, in operation, a base current is permitted from the base to the emitter of the transistor 21, a collector current $I_C$ flows through the transistor 21, so that bias currents $i_A$ and $i_B$ flow through the Hall generators 13 and 14, respectively. Since the Hall generators 13 and 14 are subjected to magnetic fields caused by the outer rotor 12, the output voltages $V_1$, $V_3$, $V_2$ and $V_4$ varie in intensity in accordance with the position of the rotor 12 relative to the stator 11 so that the field coils are energized in dependence on the position of the outer rotor 12, whereby the rotor 12 is permitted to continuously rotate. The magnitudes of the output voltages $V_1$, $V_3$, $V_2$ and $V_4$ are desiredly controlled by regulating the base current of the transistor 21. It is, in this instance, necessary to uniformly energize the field coils of the stator 11 so as to make the rotor 12 to smoothly rotate. Therefore, resistances of the resistors 24 and 25 are selected in consideration of the inner resistivities of the Hall generators 13 and 14 so as to make equal the magnitudes of the bias current $i_A$ and $i_B$.

Since, however, the Hall generators 13 and 14 are different from each other in their characteristics of sensitivity, temperature and so on, it is, in practice, impossible to make equal the amplitudes of the output voltages $V_1$, $V_2$, $V_3$ and $V_4$ which are alternate in accordance with the rotation of the outer rotor 12. The conventional driver circuit arrangement 20 cannot operate without unwanted fluctuations of the revolution speed of the rotor and/or overcurrents through one or more field coils of the motor.

In order to solve the described above, an improved drive circuit arrangement for driving an either two- or four-phase brushless motor is provided in accordance with the present invention.

In FIG. 4, there is shown a drive circuit arrangement for driving an either two- or four-phase brushless motor according to the invention. The curcuit arrangement, generally designated by reference numeral 40, generally comprises a pair of Hall generators 13 and 14 which are mounted on the stator as shown in FIG. 1, first, second, third and fourth drivers 41, 42, 43 and 44 for energizing the field coils $W_1$ and $W_5$, $W_2$ and $W_6$, $W_3$ and $W_7$, and $W_4$ and $W_8$, and first and second bias current regulator 45 and 46 for respectively regulating bias currents flowing through the Hall generators 13 and 14. The first driver 41 has an input terminal connected to the output terminal 32 of the Hall generator 13 and an output terminal 47 connected to a series connection of the field coils $W_1$ and $W_5$ which is in turn connected to a negative bus line 22 grounded. The second driver 42 has an input terminal connected to the output terminal 33 of the Hall generator 14 and an output terminal 48 connected to a series connection of the field coils $W_2$ and $W_6$ which is in turn connected to the negative bus line 22. The third driver 43 has an input terminal connected to the output terminal 34 of the Hall generator 13 and an output terminal 49 connected to a series connection of the field coils $W_3$ and $W_7$ which is in turn connected to the negative bus line 22. The fourth driver 44 has an input terminal connected to the output terminal 35 of the Hall generator 14 and an output terminal 50 connected to a series connection of the field coils $W_4$ and $W_8$ which is in turn connected to the negative bus line 22. The first bias current regulator 45 has an output bias terminal 51 connected to the bias terminal 27 of the Hall generator 14 the other bias terminal of which is connected to a positive bus line 30. The first biasing circuit 45 has a feed-back terminal 52 connected through resistors 53 and 54 to output terminals 47 and 49 of the first and third drivers 41 and 43 and connected through a smoothing capacitor 55 to the ground.

The bias current regulator 45 further has an input control terminal 56 connected to a current limiter 57 which has an input terminal 58 for receiving a speed signal. The second bias current regulator 46 has an output bias terminal 59 connected to the bias terminal 26 of the Hall generator 13 the other bias terminal of which is connected to the positive bus line 30. The second biasing circuit has a feed-back terminal 60 connected through a resistors 61 and 62 to the output terminals 48 and 50 of the second and fourth drivers 42 and 44 and connected through a smoothing capacitor 63 to the ground. The bias current regulator 46 further has an input control terminal 64 connected to the current limiter 57. The bias current limiter is adapted to limit the total of the bias currents $i_A$ and $i_B$ flowing out from the first and second bias current regulators 45 and 46 to an allowable total current determined in dependance on the speed signal representing the revolution speed of the rotor of the motor.

When, in operation, the first and second biasing circuits 45 and 46 are energized by the speed voltage signal, the bias current regulators 45 and 46 exert bias voltage of intensities according to feed-back voltages to the feed-back terminals 52 and 60 thereof, so that bias currents $i_A$ and $i_B$ flow through the Hall generators 13 and 14. With this arrangement, the output voltages $V_1$ and $V_3$, and $V_2$ and $V_4$ of the Hall generators 13 and 14 varies in concurrence with the rotation of the rotor 12 as shown in FIGS. 3A through 3D. Each of the drivers 41, 42, 43 and 44 is adapted to produce an output voltage inverse in phase to the input voltages $V_1$, $V_2$, $V_3$ and $V_4$. Accordingly, fluctuating field currents $I_1$, $I_2$, $I_3$ and $I_4$ flow through the field coils $W_1$ and $W_5$, $W_2$ and $W_6$, $W_3$ and $W_7$, and $W_4$ and $W_8$ having waveforms as shown in FIGS. 5A, 5B, 5C and 5D, so as to rotate the rotor 12.

When, in this instance, the output voltages $V_1$ and $V_2$ abruptly rise due to a certain cause, the field currents $I_1$ and $I_3$ increase, resulting in increase of the potentials on the terminals 47 and 49. The increase of the potentials on the terminals 47 and 49 are delivered through the resistors 53 and 54 to the feed-back terminal of the first bias circuit 45 which then raises the bias voltage at the output terminal 51 thereof. Therefore, the bias current $i_B$ passing through the Hall generator 14 increases thereby to increase the output voltages $V_2$ and $V_4$. Since the total of the bias currents $i_A$ and $i_B$ is limited to a current according to the revolution speed of the rotor 12, the bias current $i_A$ increases thereby to raise the voltages $V_1$ and $V_3$ until an equilibrium between the field currents $I_1$ and $I_3$, and $I_2$ and $I_4$ is established. Since, in this instance, the speed of revolution of the rotor 12 increases, the current limiter 57 reduces the allowable signal at the speed total current 57 so as to suppress the revolution speed of the rotor 12, whereby the equilibrium between the currents $I_1$ and $I_3$, and $I_2$ and $I_4$ is quickly established.

It is now apparent that the field currents through the field coils are maintained uniform by the feed-back operation of the circuit arrangement 40 as above-mentioned.

It should be appreciated that voltages $V_{13}$ and $V_{24}$ applied to the feed-back terminals of the first and second bias circuits 45 and 46 do not contain appreciably large ripple components by reason that the voltages at the output terminals of the first and third drivers 41 and 43, and the second and fourth drivers 42 and 44 are respectively inverse to each other and that the smoothing capacitors 55 and 62 pass therethrough the ripple components to ground. It should be understood that the voltages at the output terminals of the drivers 41, 43, 42 and 44 are constituted by the counter electromotive forces generated in the field coils caused by the revolution of the rotor and having magnitudes proportional to the speed of the rotor, and fluctuating voltage due to the inner impedance of the field coils and the field currents $I_1$, $I_2$, $I_3$ and $I_4$. Thus, the feed-back voltages $V_{13}$ and $V_{24}$ through the resistors 53 and 54, and the resistors 60 and 61 correspond to the average values or d-c components of currents $I_1 + I_3$, and $I_2 + I_4$, respectively. It is accordingly apparent that the particular circuit arrangement shown in FIG. 4 regulates the bias currents of the Hall generators 13 and 14 by using the average value of the field currents through the field coils.

It is, or course, possible to regulate the bias currents of the Hall generators in accordance with the peak values of the field currents $I_1$, $I_2$, $I_3$ and $I_4$. In this case, the resistors 54, 55, 60 and 61 may be replaced by rectifiers. When the bias currents of the Hall generators 13 and 14 are regulated in dependence on the peak values of the field currents, the field currents can be maintained more favourably uniform.

In FIG. 6, there is shown another circuit arrangement according to the invention, which has the same construction as that of the circuit arrangement of FIG. 4 except that the resistors 54, 55, 61 and 62 are replaced by rectifiers 70, 71, 72 and 73. Since, in this case, the bias currents of the Hall generators are regulated in accordance with the peak values of the field currents $I_1$, $I_2$, $I_3$ and $I_4$, the field currents are maintained more precisely uniform.

Figure 7:
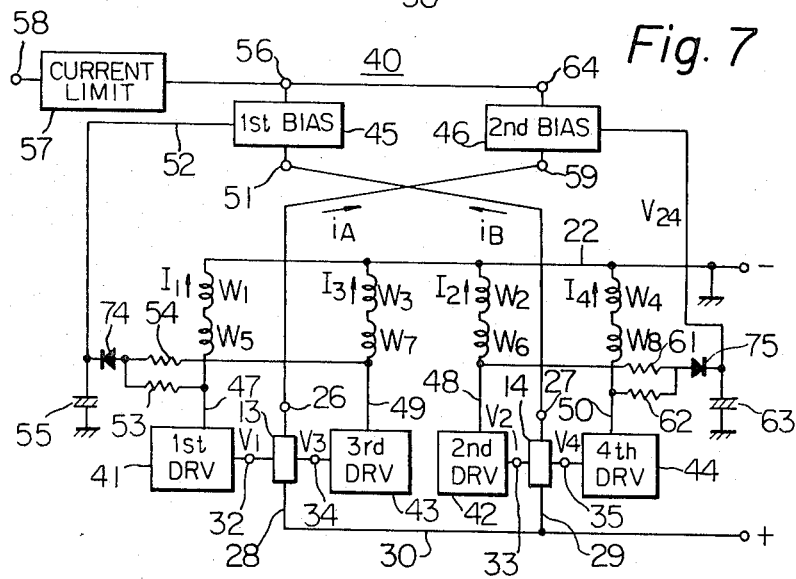
FIG. 7 is a diagram showing a further circuit arrangement according to the invention.

In FIG. 7, another circuit arrangement according to the invention is illustrated which has the same construction as that of the circuit arrangement of FIG. 4 except that the output terminals 47 and 49 of the first and second drivers 41 and 43 are connected through resistors 53 and 54 to the anode of a rectifies 74 the cathode of which is connected to the input terminal 52 of the first bias current regulator 45 and that the output terminals 48 and 50 of the drivers 42 and 44 are connected through resistors 61 and 62 to the anode of a rectifier 75 the cathode of which is connected to the input terminal 60 of the second bias current regulator 46. The operation of the circuit arrangement of FIG. 7 is similar to that of the circuit of FIG. 6.

Figure 8:
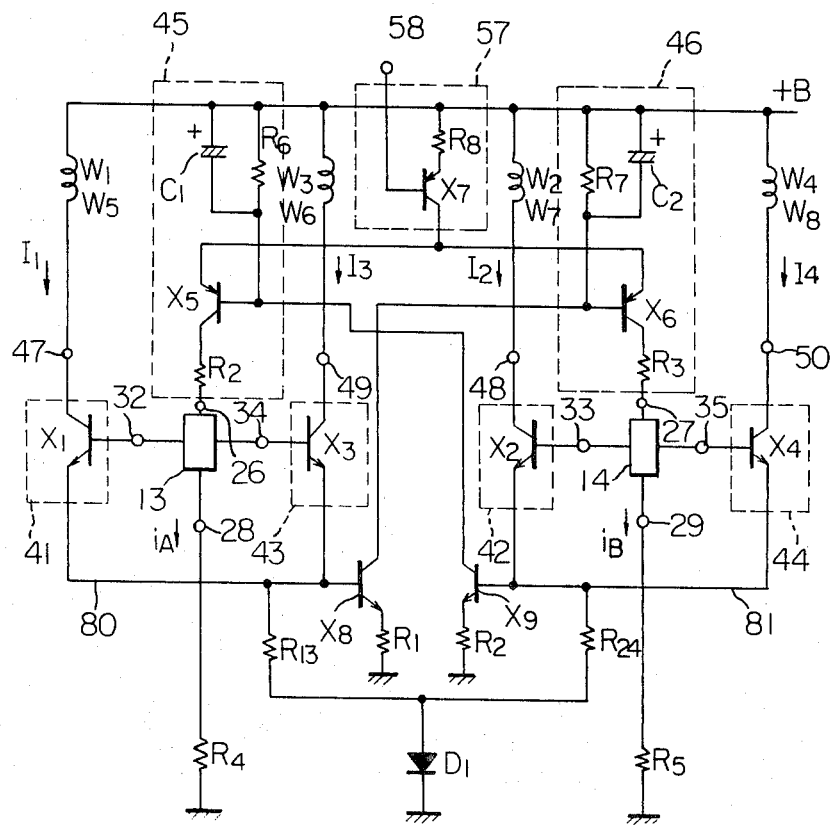
FIG. 8 is a diagram showing a still further circuit arrangement according to the invention.

In FIG. 8, there is shown a further circuit arrangement according to the invention, which comprises a pair of Hall generators 13 and 14 respectively having output terminals 32 and 34, and 33 and 35. The output terminals 32 and 34 are connected to the bases of transistors $X_1$ and $X_3$ respectively serving as drivers 41 and 43. The output terminals 33 and 35 of the Hall generator 14 are connected to the bases of transistors $X_2$ and $X_4$ respectively serving as drivers 42 and 44. The collectors of the transistors $X_1$ and $X_3$ are respectively connected to the field coils $W_1$ and $W_5$, and $W_3$ and $W_6$ which are inturn connected to a positive bus line +B. The collectors of the transistors $X_2$ and $X_4$ are respectively connected to the field coils $W_2$ and $W_7$, and $W_4$ and $W_8$ which are in turn connected to the bus line +B. The emitters of the transistors $X_1$ and $X_3$ are connected to a line 80 connected to the base of a transistor $X_8$. The emitters of the transistors $X_2$ and $X_4$ are connected to a line 81 connected to the base of a transistor $X_9$. The line 80 and 81 are respectively grouned through resistors $R_{13}$ and $R_{24}$ and a level shift diode $D_1$, so that potentials of the line 80 and 81 are held slightly above the earth potential. The emitters of the transistors $X_8$ and $X_9$ are respectively grounded through resistors $R_1$ and $R_2$. The collectors of the transistors $X_8$ and $X_9$ are respectively connected to the bases of the transistors $X_5$ and $X_6$ of bias regulator 45 and 46. The collectors of the transistors $X_5$ and $X_6$ are respectively connected through resistors $R_2$ and $R_3$ to bias terminals 26 and 27 of the Hall generators 13 and 14. The other bias terminals 28 and 29 of the Hall generators 13 and 14 are connected through resistors $R_4$ and $R_5$ to the ground. The bases of the transistors $X_5$ is connected through a biasing parallel connection of a resistor $R_6$ and a capacitor $C_1$ to the bus line +B. The base of the transistor $X_6$ is connected through a biasing parallel connection of a resistor $R_7$ and a capacitor $C_2$ to the bus line +B. The emitters of the transistors $X_5$ and $X_6$ are connected to the collector of a transistor $X_7$ serving as a current limiter. The emitter of the transistor $X_7$ is connected through a resistor $R_8$ to the bus line +B. The base of the transistor $X_7$ is connected to a speed signal input terminal 58 to which the speed signal representing the revolution speed of the rotor of the motor is applied.

When, in operation, field currents $I_1$, $I_2$, $I_3$ and $I_4$ flow through the transistors $X_1$, $X_2$, $X_3$ and $X_4$ in dependence on the output voltages of the Hall generators 13 and 14. The field currents $I_1$ and $I_3$ flow through the base of the transistor $X_8$ whereby the base current of the transistor $X_6$ is varied in accordance with the magnitudes of the field currents $I_1$ and $I_3$. The base current of the transistor $X_5$ is also varied in accordance with the magnitudes of the field currents $I_2$ and $I_4$. The bias currents $i_A$ and $i_B$ through the Hall generators 13 and 14 are therefore regulated in dependence on the magnitudes field currents $I_1$ and $I_3$, and $I_2$ and $I_4$. Since the both bias currents $i_A$ and $i_B$ flow through the transistor $X_7$, the total of the bias currents $i_A$ and $i_B$ is determined by the base current of the transistor $X_7$ which is regulated in dependence on the speed signal applied to the terminal 58.

It should be now appreciated that since the field currents are detected by the circuits respectively including the transistors $X_8$ and $X_9$ unwanted influence of the reverse electromotive force generated in the field coils can be avoided.

It should be appreciated that since the drive circuit arrangement of the invention regulates the bias currents through the Hall generators in dependence on the field currents through the field coils, the field currents are maintained uniform, so that unwanted vibrations of the rotor, fluctuations in the speed of revolution of the rotor, and overload of one or more elements in the drive circuit can be avoided. Furthermore, it is unnecessary to coincide to one another characteristics of the Hall generators, transistors, etc. employed in the drive circuit arrangement.

Although the present invention is described above in connection with a four-phase brushless motor, it is apparent that the invention is not limited to a four-phase brushless motor drive circuit arrangement but the invention can be applicable to two-phase brushless motors by using a pair of Hall generator each having a single output terminal.

It will be understood that the invention is not to be limited to the exact construction shown and described and that various changes and modifications may be made without departing from the spirit and scope of the invention, as defined in the accompanying claims.

What is claimed is:

1. A drive circuit arrangement for driving a brushless d-c motor, which comprises:
   first and second Hall generators each of which produces at least one control voltage in accordance with the intensity of a bias current flowing therethrough and the intensity of a magnetic field applied thereto, said first and second Hall generators being placed in the vicinity of the rotor of said motor and spaced from each other through a rectangular electric angle so that each of said Hall generators is subjected to an alternate magnetic field due to the revolution of said rotor;
   at least one first driver for supplying a field current to at least one first field coil in dependence on the control voltage signal from said first Hall generator;
   at least one second driver for supplying a field current to at least one second field coil in dependence on the control voltage signal from said second Hall generator;
   a first field current detector for producing a first feed-back signal representing the magnitude said field current through said first field coil;
   a second field current detector for producing a second feed-back signal representing the magnitude of said field current through said second field coil;
   a first bias current regulator for supplying to said second Hall generator a second bias current having a magnitude in dependence on said first feedback signal;
   a second bias current regulator for supplying to said first Hall generator a first bias current having a magnitude in dependence on said second feedback signal; and
   a bias current limiter for limiting the total of said first and second bias currents below a current in dependence on the revolution speed of said rotor.

2. A drive circuit arrangement for driving a four-phase d-c brushless motor, which comprises:

first and second Hall generators each of which produces a pair of control voltages inverse in phase to each other and of magnitudes in dependence on the intensity of a bias current flowing therethrough and the intensity of a magnetic field applied thereto, said first and second Hall generators being placed in the vicinity of the rotor and spaced from each other through a rectangular electric angle so that each of said Hall generators is subjected to an alternate magnetic field due to the revolution of said rotor;

a first driver for supplying to the first phase field coil a first field current having a magnitude dependent on one of the control voltage from said first Hall generator;

a second driver for supplying to the second phase field coil a second field current having a magnitude dependent on one of the control voltages from said second Hall generator;

a third driver for supplying to the third phase field coil a third field current having a magnitude dependent on the other of the control voltages from said first Hall generator;

a fourth driver for supplying to the fourth phase field coil a fourth field current having a magnitude dependent on the other of the control voltages from said second Hall generators;

a first field current for producing a first feed-back signal representing the magnitudes of said first field and third field currents;

a second field current detector for producing a second feed-back signal representing the magnitudes of said second and fourth field currents;

a first bias current regulator for supplying to said second Hall generator a second bias current having a magnitude in dependence on said first feedback signal;

a second bias current regulator for supplying to said first Hall generator a first bias current having a magnitude in dependence on said second feedback signal; and a current limiter for limiting the total of said first and second bias current below a current in dependence on the revolution speed of said rotor.

3. A drive circuit arrangement as claimed in claim 2, in which said first, second, third and fourth drivers respectively include first, second, third and fourth transistors the collectors of which are connected to said first, second, third and fourth field coils, respectively; said first field current detector includes a first resistor having one terminal connected to the emitters of said first and third transistors and the other terminal grounded, and a fifth transistor having the base thereof connected to said one terminal of the resistor and the emitter thereof grounded; and said second field current detector includes a second resistor having one terminal connected to the emitters of said second and fourth transistors and the other terminal grounded, and a sixth transistor having the base thereof connected to said one terminal of the second resistor and the emitter thereof grounded.

4. A drive circuit arrangement as claimed in claim 3, in which said first bias current regulators includes seventh transistor having the collector thereof connected to the bias terminal of said second Hall generator; said second bias current regulator includes a eighth transistor having the collector thereof connected to the bias terminal of said first Hall generator; and said current limiter includes a ninth transistor having the collector thereof connected to the emitters of said seventh and eighth transistors and the emitter thereof connected to a power source.

* * * * *